United States Patent [19]

Hempelmann

[11] Patent Number: 4,669,787
[45] Date of Patent: Jun. 2, 1987

[54] SIMULATED WIRE WHEEL TRIM

[75] Inventor: Heinrich J. Hempelmann, Livonia, Mich.

[73] Assignee: NI Industries, Inc., Novi, Mich.

[21] Appl. No.: 722,987

[22] Filed: Apr. 15, 1985

Related U.S. Application Data

[63] Continuation of Ser. No. 431,398, Sep. 30, 1982, abandoned.

[51] Int. Cl.⁴ .............................................. B60B 7/04
[52] U.S. Cl. ................................ 301/37 SS; 301/37 P
[58] Field of Search ............. 301/37 SS, 37 P, 37 SA, 301/37 C, 37 R, 37 B, 37 CM

[56] References Cited

U.S. PATENT DOCUMENTS

| | | |
|---|---|---|
| Re. 24,402 | 12/1957 | Lyon . |
| Re. 25,142 | 3/1962 | Lyon . |
| Re. 25,144 | 3/1962 | Lyon . |
| 2,713,513 | 7/1955 | Lyon . |
| 2,713,514 | 7/1955 | Lyon . |
| 2,713,515 | 7/1955 | Lyon . |
| 2,713,516 | 7/1955 | Lyon . |
| 2,713,517 | 7/1955 | Lyon . |
| 2,713,519 | 7/1955 | Lyon . |
| 2,824,766 | 2/1958 | Lyon . |
| 2,847,096 | 8/1958 | Lyon . |
| 2,847,252 | 8/1958 | Lyon . |
| 2,847,253 | 8/1958 | Lyon . |
| 2,862,767 | 12/1958 | Lyon . |
| 2,928,694 | 3/1960 | Lyon, Jr. . |
| 3,145,059 | 8/1964 | Hemstreet . |
| 3,145,062 | 8/1964 | Judd . |
| 3,178,231 | 4/1965 | Hezler, Jr. ....................... 301/37 SS |
| 4,166,653 | 9/1979 | Claucherty ....................... 301/37 SS |
| 4,275,930 | 6/1981 | Kamihama ........................ 301/37 R |
| 4,355,848 | 10/1982 | Ookubo et al. .................. 301/37 SS |
| 4,364,608 | 12/1982 | Ookubu et al. .................. 301/37 SS |
| 4,397,504 | 8/1983 | Connell ........................... 301/37 SS |
| 4,410,217 | 10/1983 | Loren .............................. 301/37 SS |
| 4,422,692 | 12/1983 | McClure .......................... 301/37 SS |
| 4,457,561 | 7/1984 | Whitmarsh ....................... 301/37 SS |

Primary Examiner—Randolph A. Reese
Assistant Examiner—Russell D. Stormer
Attorney, Agent, or Firm—Harness, Dickey & Pierce

[57] ABSTRACT

A simulated wire wheel trim for a vehicle wheel is disclosed which requires assembly of only three basic members yet still provides a very realistic appearing interleaved spoke pattern. The wheel trim includes an outer hub member having a plurality of integrally formed spokes, an inner hub member also having a plurality of spokes integrally formed therewith, the outer ends of which are interconnected by an annular flange portion and an annular ring member to which the annular flange portion and other spoke ends are connected. A suitable retention system for retaining the wheel trim on a vehicle wheel may also be attached to the annular ring member. The wheel trim is particularly designed to be fabricated from polymeric compositions so as to provide a very lightweight yet realistic appearing simulated wire wheel trim.

14 Claims, 9 Drawing Figures

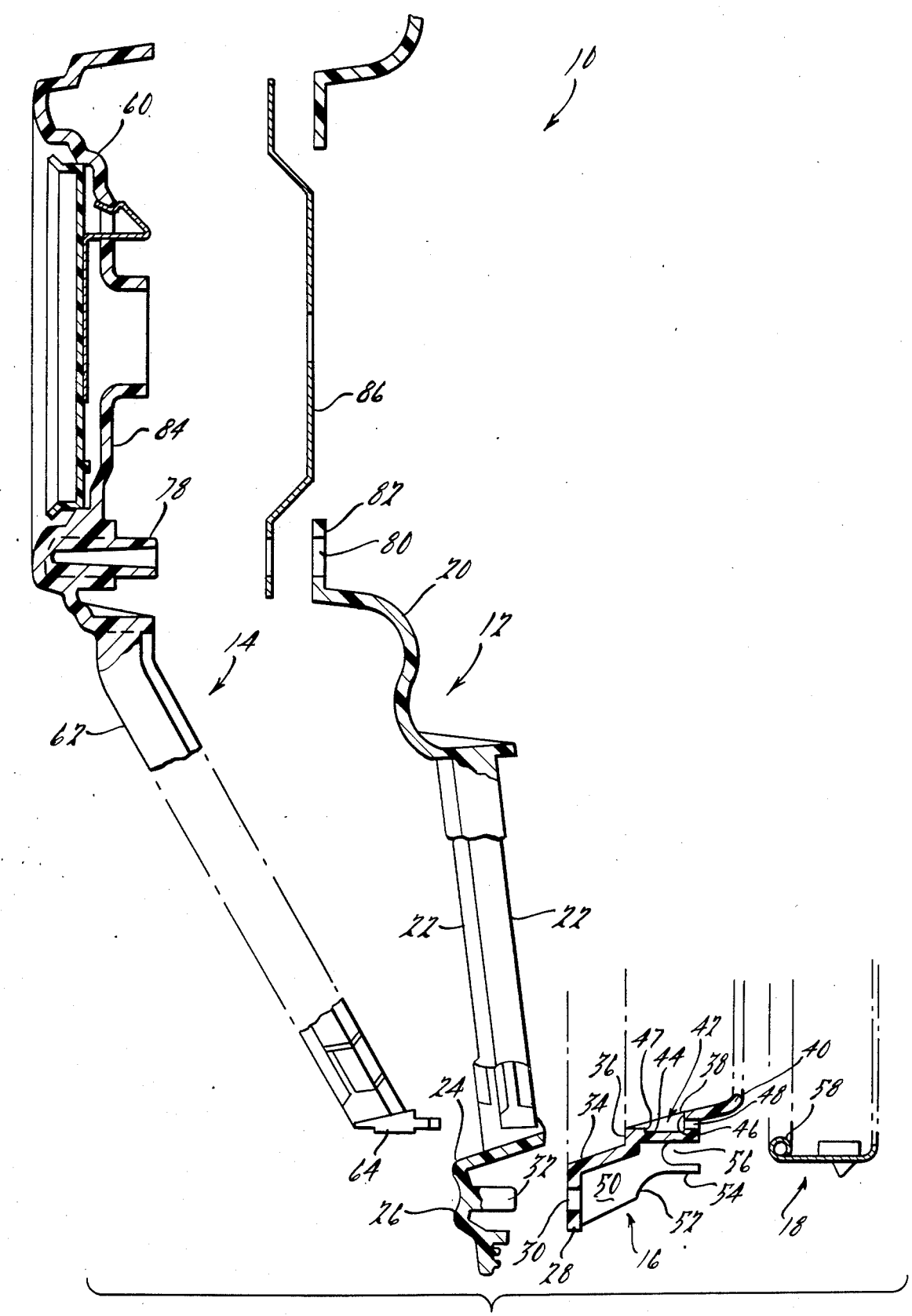

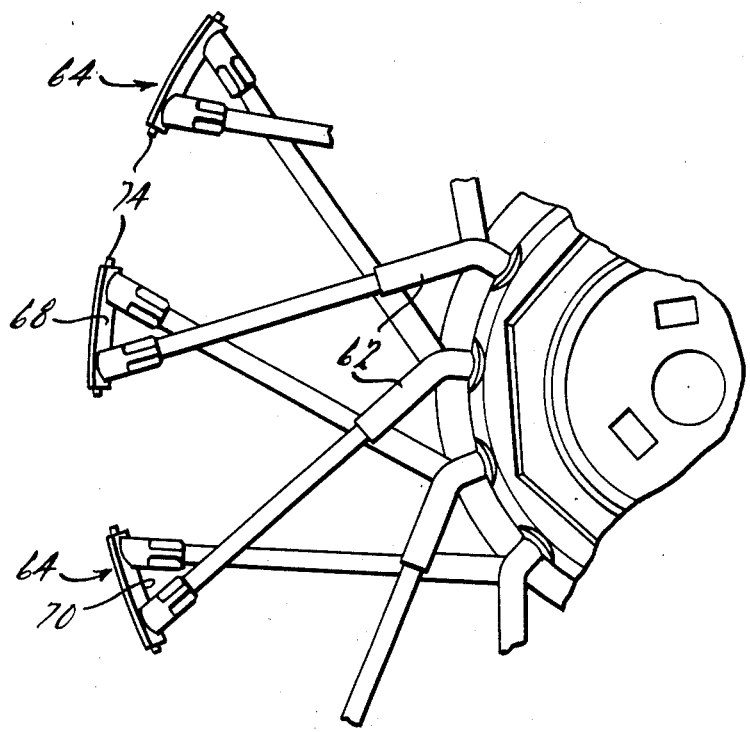
FIG. 7.
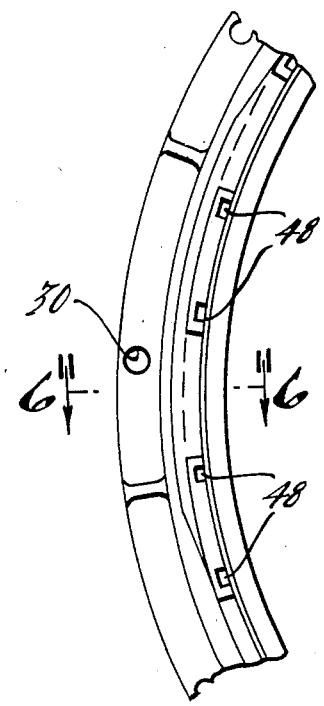
FIG. 4.
FIG. 8.
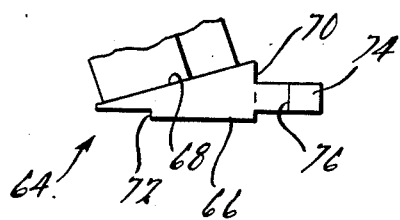
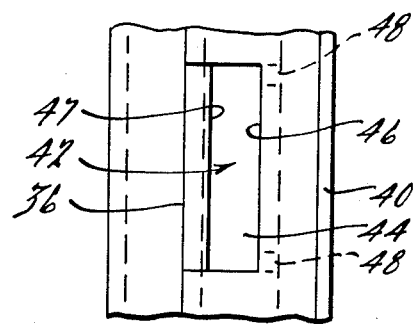
FIG. 5.
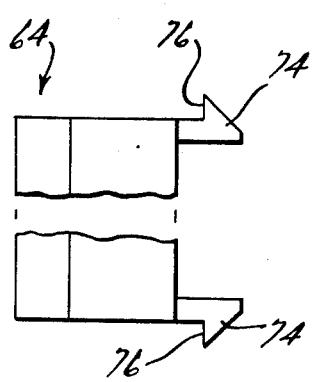
FIG. 9.
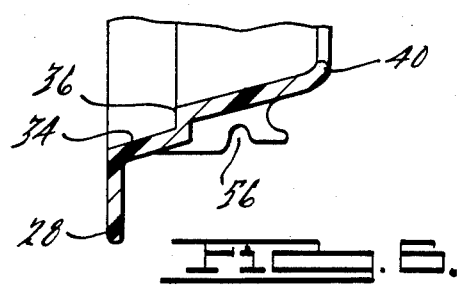
FIG. 6.

SIMULATED WIRE WHEEL TRIM

This application is a continuation of application Ser. No. 431,398, filed Sept. 30, 1982, now abandoned.

BACKGROUND OF THE INVENTION

The present invention relates generally to wheel trim and more particularly to simulated wire wheel trim designed to be fabricated from polymeric compositions with a minimum number of component parts.

In order to provide a simulated wire wheel trim which affords a realistic appearance when installed on a motor vehicle, it is desirable to provide multiple axially spaced layers of spoke members which are interleaved in both radial and axial directions. One way by which this has been accomplished in the past is to separately fabricate the spoke elements either individually or often as pairs from metal tubular stock. A separate annular disc may then have a relatively large number of these spoke members assembled thereto along with multiple center hub members to retain and axially space different layers of the radially inner ends of the spoke members.

While this procedure may provide a very attractive and realistic appearing simulated wire wheel trim, it requires assembly of a substantial number of parts thus imparting a relatively high cost of manufacture. This increased cost is further magnified when the costs of separately manufacturing, handling, stocking, etc. of each of the component parts is considered. Further, simple logic indicates that the greater the number of parts included in such a wheel trim, the more likely it is that objectionable rattle may occur.

In addition to designing such wheel trim to give a very realistic appearance, it is also desirable to keep the weight of such wheel trim to a minimum particularly because this represents unsprung weight when attached to the vehicle wheel.

The present invention provides a very realistically appearing wire wheel trim which substantially overcomes these problems. The wheel trim of the present invention comprises three basic assembly pieces which provide the entire axially and radially interleaved spoke configuration necessary to afford a realistic spoke pattern. Thus, the need to separately manufacture and assemble a plurality of separate spoke members is eliminated. Further, the wheel trim of the present invention is designed to be fabricated from a polymeric composition. The use of polymeric materials as well as the minimal number of separate parts offers substantial advantages in reduction of weight and assembly cost savings. Further, because the spokes are integrally formed along with the support members, the number of interconnections is significantly reduced as is the likelihood for annoying rattles or the like.

Additional advantages and features of the present invention will become apparent from the subsequent description and the appended claims taken in conjunction with the accompanying drawings.

BRIEF DESCRIPTION OF THE DRAWINGS

FIG. 3 is an exploded section view similar to that of FIG. 2;

FIG. 4 is a fragmentary view of a portion of the axially inner ring member as viewed looking in an axial outward direction;

FIG. 5 is another fragmentary view of the axially inner ring member viewed looking radially outwardly and showing the flange receiving pocket formed therein;

FIG. 6 is a section view of the axially inner ring member of FIG. 4, the section being taken along line 6—6 thereof;

FIG. 7 is a fragmentary view of a portion of the outer hub member shown in FIG. 3 as seen looking axially inwardly;

FIG. 8 is an enlarged fragmentary edge view of the spoke connecting flange portion provided on the outer hub member; and FIG. 9 is an enlarged fragmentary view of the spoke connecting flange portion of the outer hub member as seen looking radially inwardly.

DESCRIPTION OF THE PREFERRED EMBODIMENT

Figure 1:
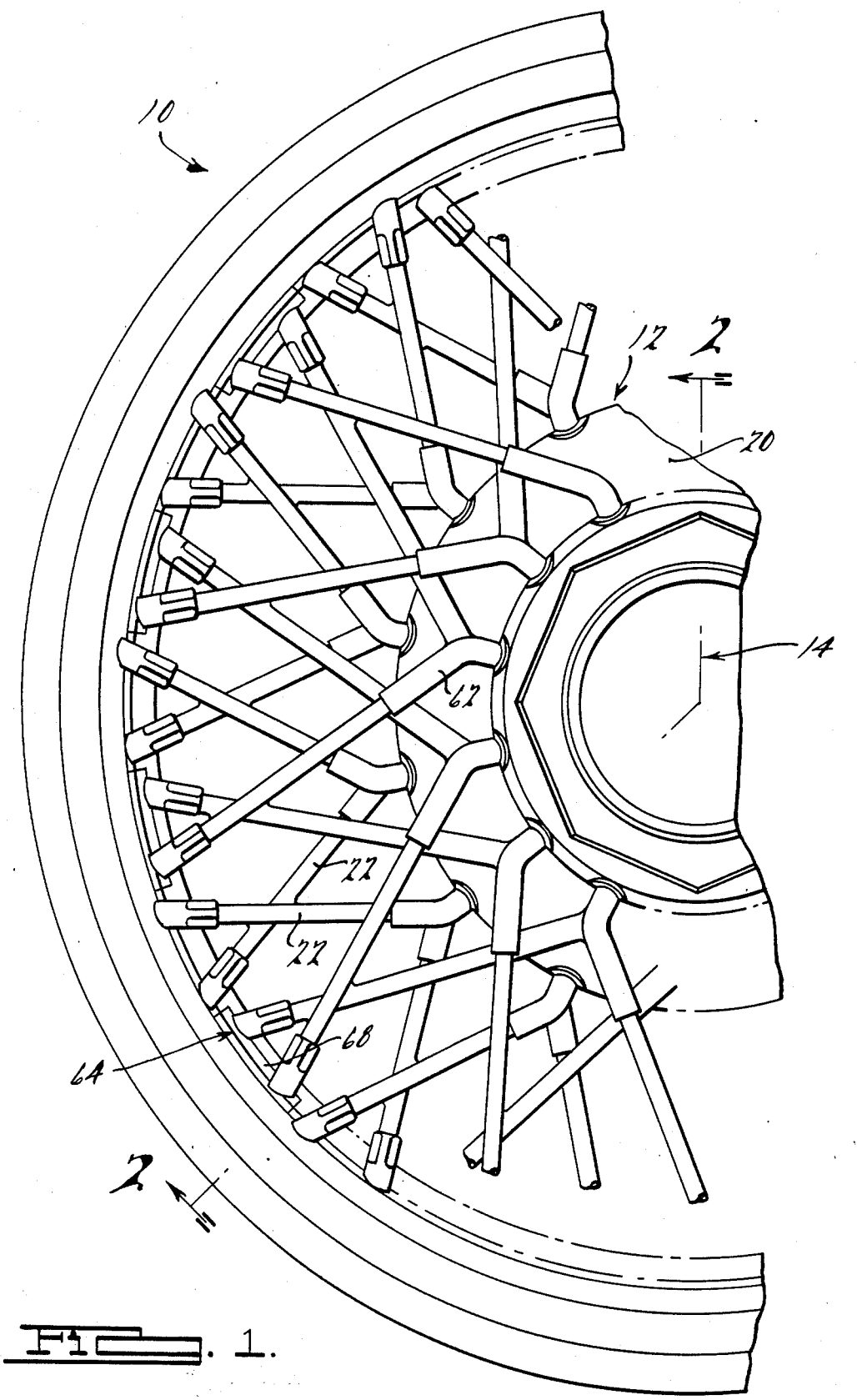
FIG. 1 is a front view in elevation of a simulated wire wheel trim in accordance with the present invention.
Figure 2:
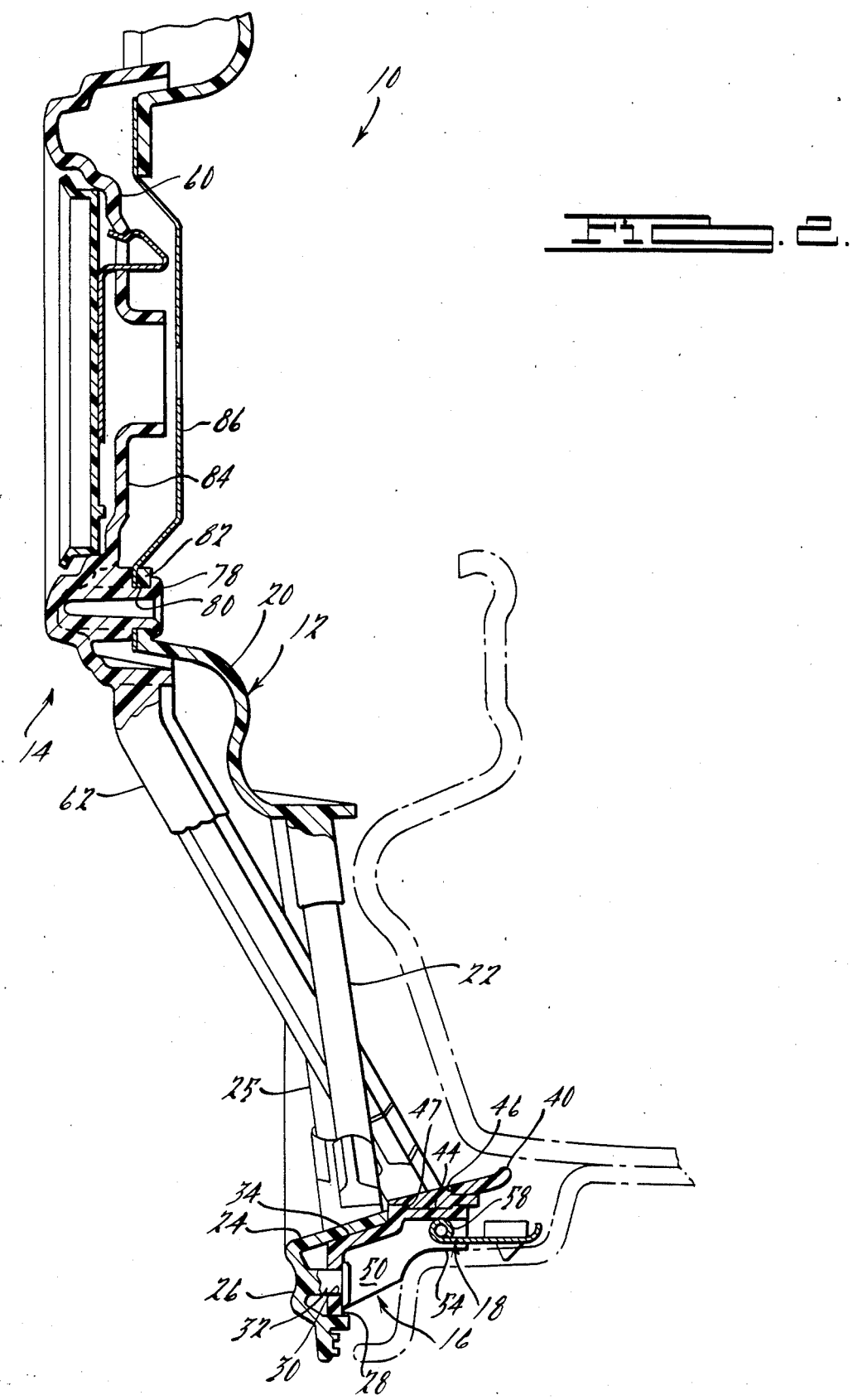
FIG. 2 is an enlarged fragmentary sectioned view of the wheel trim of FIG. 1, the section being taken along a radial plane extending the axis of rotation thereof.

Referring now to the drawings and in particular to FIGS. 1 through 3, there is shown a simulated wire wheel trim in accordance with the present invention generally indicated by the reference number 10. Wheel trim 10 comprises axially inner and outer members 12 and 14 each of which include a plurality of integrally formed generally radially outwardly extending spoke members and an annular ring member 16 to which retention means 18 may be secured.

Inner member 12 includes an irregularly shaped annular center multi-flanged portion defining a central hub 20 from which a plurality of circumferentially spaced spokes 22 extend generally radially outwardly the spokes being grouped in pairs which diverge radially outwardly from hub 20. An integrally formed annular outer flange or ring 24 interconnects the outer ends of each of the spokes 20 and includes an ornamental generally radially outwardly extending ornamental flange portion 26.

Annular ring member 16 includes a generally radially extending flange portion 28. A plurality of circumferentially spaced openings 30 are provided in flange portion 28 which are adapted to receive integrally formed axially inwardly projecting posts 32 formed on the inner member 12 which may then be staked so as to retain ring member 16 in assembled relationship with inner member 12.

A radially and axially inwardly inclined flange portion 34 extends inwardly from the inner edge of flange portion 28 and terminates at a generally radially inwardly extending step 36. A generally axially and radially inwardly extending flange portion 38 extends from the radially inner edge of step 36 and terminates in a slight radially inwardly directed ornamental curl 40.

As best seen with reference to FIG. 5, a plurality of circumferentially spaced recesses or pockets 42 are formed around the flange portion 38 of ring member 16. Each of these pockets 42 are substantially identical and include generally axially and radially extending wall portions 44 and 46 respectively positioned at substantially right angles to each other. As shown, sidewall 44 forms a shoulder or step 47 at its intersection with step 36. A pair of openings 48 are provided in radially extending wall portion adjacent opposite ends thereof. A plurality of generally radially outwardly projecting axially extending flanges 50 are also provided on outer ring member which cooperate to define axially and radially extending shoulders 52 and 54 engageable with portions of the vehicle wheel for assisting in positioning of the trim member upon assembly to the vehicle wheel. Additionally, a channel 56 is also defined thereby adjacent the axially inner edge of flange 50 which is adapted to receive a beaded portion 58 of tooth carrying retention band 18. The details of retention band 18 and manner by which it is attached to outer ring member 16 are described more fully in assignee's copending application Ser. No. 342,781, filed Jan. 26, 1982 entitled "Wheel Trim Retention", now U.S. Pat. No. 4,447,092.

Outer member 14 also has a central flanged hub member 60 from which a plurality of spokes 62 extends generally radially outwardly. Similar to spokes 22, spokes 62 are arranged in paired groups with the spokes of each group diverging in a radially outward direction. Additionally, in order to achieve an axial interleaving effect, spokes 62 are also angled slightly in an axially inward direction. The outer ends of selected ones of spokes 62 are interconnected by a circumferentially extending relatively short integrally formed flange portions 64.

As more clearly shown in FIGS. 7 and 8, each of these flange portions 64 is generally triangular in cross section including a generally axially extending radially outer sidewall 66, a generally radially and axially extending inclined inner sidewall 68 into which spokes 62 merge and a generally radially and circumferentially extending axially inner sidewall 70. A step 72 is provided on sidewall 66 which is designed to be received within pocket 42 described above and to cooperate with shoulder 47 to prevent axial outward movement of flange portion 64. Also, depending or extending axially inwardly from surface 70 adjacent opposite ends of flange portion 64 are a pair of locking tab members 74 which are adapted to be received within openings 48 in radially extending wall portion 46 of pockets 42. As shown therein, each of tabs has a circumferentially extending hook portion 76 which upon insertion of locking tab 74 through opening 48 wall engage the inner surface of wall portion 46 so as to form a mechanical interlock to securely retain flange portion 64 seated within pocket 42.

The central hub portion of outer member also includes a plurality of circumferentially spaced posts 78 integrally formed therewith which extend axially inwardly and through a plurality of openings 80 provided in a generally radially inwardly extending flange portion 82 of inner member 12. Once inner and outer members 12 and 14 are assembled, posts 78 may be heat staked and thereafter will operate to retain these members in secure assembled relationship. Heat staking as used herein refers to the process of heading of plastic or polymeric projections by application of pressure and heat to the terminal end thereof whereby the end portion is enlarged. Alternatively, suitable threaded or other types of fasteners may be substituted for staking of these posts if desired.

While if desired the central portion 84 of hub 60 may be contoured and/or ornamented in any desired manner such as by way of a suitable medallion or the like as shown central portion 60 is designed to accommodate a center retention/lock system.

As shown, a metal flange member 86 is provided being clamped between inner and outer members 12 and 14. Flange member 86 may be provided with a centrally positioned captive threaded bolt (not shown) adapted to engage a lock bracket secured to the vehicle wheel. In order to afford access to the captive bolt, a removable decorative center medallion 88 or the like may be provided to overlie and conceal an opening 90 in hub portion 60 of outer member 14. The details of the center retention/lock arrangement may be of the type described and shown in either of assignee's copending applications Ser. No. 347,683, filed Feb. 11, 1982 entitled "Wheel Trim Center Retention System" or Ser. No. 352,570, filed Feb. 23, 1982 entitled "Wheel Trim Retention System", now abandoned the disclosures of which are hereby incorporated by reference.

As is now apparent the present invention provides a realistic appearing simulated wire wheel trim which may be substantially entirely fabricated from polymeric composition materials at relatively low cost and easily and securely assembled. The use of such materials at relatively low cost and easily and securely assembled. The use of such materials offer advantages not only in cost and assembly time but also substantial reduction in weight which may contribute to smoother ride performance particularly in today's smaller lighter weight vehicles. Additionally, unlike prior simulated wire wheel trims formed of polymeric compositions, the present invention provides an axially and radially interwoven spoke pattern while still requiring assembly of only three separately formed components.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A simulated wire wheel trim comprising:
   a first member having a generally circular center portion from which a first plurality of integrally formed spokes extend generally radially outwardly;
   a second member having a generally circular center portion from which a second plurality of integrally formed spokes extend generally radially outwardly,
   integrally formed flange means interconnecting outer ends of selected pairs of said second plurality of spokes;
   ring means including a plurality of circumferentially spaced pockets integrally formed thereon, said flange means including integrally formed means cooperating with said pockets to mechanically lock said flange means in respective of said pockets, the outer ends of said first plurality of spokes also being secured to said ring means; and
   retention means for securing said wheel trim to a vehicle wheel.

2. A wire wheel trim as set forth in claim 1 wherein said integrally formed means comprise a lock tab received within an opening provided in said pocket.

3. A wire wheel trim as set forth in claim 1 wherein said integrally formed means include a pair of lock tabs positioned at opposite ends of said flange portion each being receivable within openings in said pocket.

4. A wire wheel trim as set forth in claim 1 wherein the outer ends of said first plurality of spokes are interconnected by annular flange means, said flange means being secured to said ring means.

5. A wire wheel trim as set forth in claim 4 wherein said first member and said annular flange means are formed from a polymeric composition.

6. A wire wheel trim as set forth in claim 5 wherein said annular flange means is secured to said ring means by staking of a plurality of projections integrally formed on said annular flange means and projecting through openings in said ring means.

7. A wire wheel trim as set forth in claim 1 wherein the radially outer ends of said first plurality of spokes are secured to said ring means axially outwardly from the radially outer ends of said second plurality of spokes.

8. A wire wheel trim as set forth in claim 1 wherein said first plurality of spokes are arranged in overlapping criss-cross relationship with each other.

9. A wire wheel trim as set forth in claim 1 wherein said first member is formed from a polymeric composition and said center portion thereof is secured to said center portion of said second member.

10. A wire wheel trim as set forth in claim 9 wherein said center portion of said first member is secured to said center portion of said second member by heat staking of a plurality of protrusions integrally formed with said first member extending through openings in said second member.

11. A wire wheel trim as set forth in claim 1 wherein said first and second members and said ring means are all formed from a polymeric composition.

12. A simulated wire wheel trim comprising:

an annular ring member formed from a polymeric composition;

a first member formed from a polymeric composition and having an annular flange portion forming at least a portion of a decorative center hub of said trim and having a first plurality of integrally formed spokes extending generally radially outwardly, the outer ends of said first plurality of spokes being connected by an integrally formed annular flange;

a second member formed from a polymeric composition having a decorative center hub portion from which a second plurality of integrally formed spokes extend generally radially outwardly, the outer ends of selected pairs of said second plurality of spokes being interconnected by integrally formed flange segments;

said first member being secured to said hub portion and said annular flange being secured to said ring member, said flange segments being of a size to be moved axially between ones of said first plurality of spokes and including interlocking means for securing said flange segments to said ring member axially inwardly from said annular flange.

13. A wire wheel trim as set forth in claim 12 wherein said ring member includes a plurality of circumferentially spaced pockets, said flange segments being secured within said pockets.

14. A wire wheel trim as set forth in claim 13 wherein said interlocking means comprise an opening in said pocket adapted to receive a tab portion formed on said flange segment.

* * * * *

UNITED STATES PATENT AND TRADEMARK OFFICE
CERTIFICATE OF CORRECTION

PATENT NO. : 4,669,787
DATED : June 2, 1987
INVENTOR(S) : Heinrich J. Hempelmann It is certified that error appears in the above-identified patent and that said Letters Patent is hereby corrected as shown below:

Column 2, line 28, "include" should be -- includes --.

Column 3, line 41, "wall" should be -- will --.

Column 4, lines 17 and 18, delete "The use of such materials at relatively low cost and easily and securely assembled."

Signed and Sealed this

Third Day of November, 1987

*Attest:*

DONALD J. QUIGG

*Attesting Officer*  *Commissioner of Patents and Trademarks*